Jan. 1, 1935.　　　B. D. BEDFORD　　　1,986,617
ELECTRIC VALVE TRANSLATING CIRCUIT
Filed Sept. 30, 1933
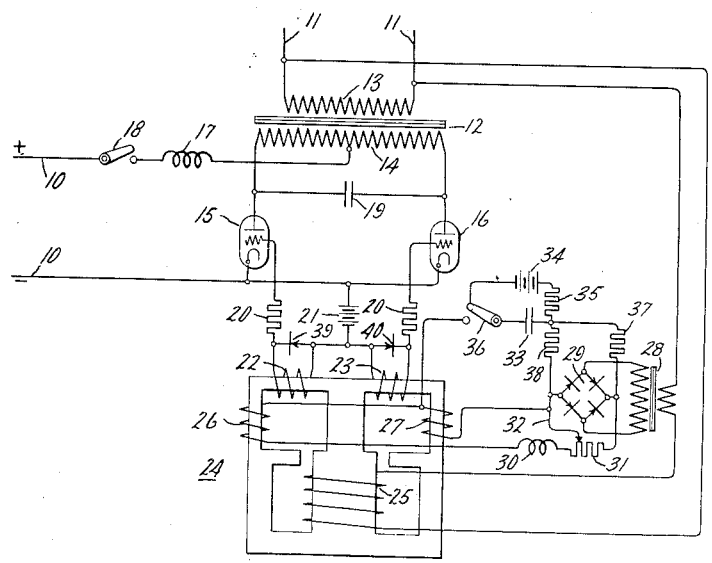
Inventor:
Burnice D. Bedford,
by Harry E. Dunham
His Attorney.

Patented Jan. 1, 1935

1,986,617

UNITED STATES PATENT OFFICE 1,986,617

ELECTRIC VALVE TRANSLATING CIRCUIT

Burnice D. Bedford, Schenectady, N. Y., assignor to General Electric Company, a corporation of New York Application September 30, 1933, Serial No. 691,660

8 Claims. (Cl. 175—363)

My invention relates to electric valve translating circuits and more particularly to improved excitation apparatus for the valves included in such circuits.

Heretofore there have been devised numerous electric valve translating circuits including a source of alternating current and an elecltric valve provided with a control electrode in which the control of the electric valve is effected by impressing upon the control electrode an alternating potential and varying the phase of the alternating control potential with respect to that impressed upon the anode of the electric valve. In the arrangements of the prior art the shift in phase of the alternating control potential has generally been obtained by means of a rotary phase shifting transformer or an impedance bridge phase shifting circuit. It has been found that, for any particular setting of the phase shifting arrangement of the types just mentioned, the phase of the control potential tends to vary with the operating conditions of the translating circuit. This is particularly true in the case of appreciable variations of the operating frequency of the circuit. Another known apparatus for controlling the phase of the alternating potential is a self-saturating transformer provided with an auxiliary saturating winding energized from a controllable source of unidirectional current. With such an apparatus the control potential is one of very peaked wave form comprising substantially a series of peaked impulses, these impulses occurring at the instants at which the exciting current of the transformer reverses polarity. The phase of the peaked impulses is varied by varying the unidirectional saturating current, but the phase of the control potential of such an arrangement is very sensitive to variations in the magnitude of the alternating exciting voltage.

It is an object of my invention to provide an improved excitation circuit for an electric valve translating circuit by means of which an alternating control potential for the electric valve may be obtained which bears a predetermined phase relation to that of the source of alternating current.

It is another object of my invention to provide an improved electric valve translating circuit and an excitation apparatus therefor, by means of which there may be impressed an alternating control potential upon the control electrode of the electrode valve having a predetermined phase with respect to the anode potential of the valve irrespective of variations in the operating conditions of the circuit.

As one embodiment of my invention I have illustrated its application to a self-excited electric valve inverter of the parallel type in which it is effective to maintain constant the commutating angle of the inverter. In accordance with this embodiment of my invention the control electrodes of the electric valves of the inverter are excited from the alternating potential output of the inverter through a self-saturating transformer which is effective to convert the alternating potential output of the inverter into one of peaked wave form. This transformer is provided also with an auxiliary saturating winding. A current transformer is connected in series with the primary winding of the self-saturating transformer and a rectifier means is connected to energize the auxiliary saturating winding from the current transformer. The phase of the secondary potential of such a transformer is determined by the ratio between the unidirectional magnetomotive force of the auxiliary saturating winding and the maximum value of the magnetomotive force of the primary winding of the transformer. In the system just briefly described, this ratio is constant since the unidirectional magnetomotive force of the auxiliary saturating windings is proportional to and dependent upon the exciting current of the primary winding of the transformer. Thus, the phase of the control potential of the electric valves is maintained constant.

For a better understanding of my invention, together with other and further objects thereof, reference is had to the following description taken in connection with the accompanying drawing and its scope will be pointed out in the appended claims. In the drawing, the single figure diagrammatically illustrates my invention applied to a single phase electric valve inverting apparatus.

Referring now more particularly to the drawing, there is shown an electric valve converting apparatus for transmitting energy from a direct current supply circuit 10 to a single phase alternating current circuit 11. This apparatus comprises a transformer 12 having a secondary winding 13 connected to the alternating current load circuit 11 and a primary winding 14. The end terminals of the winding 14 are connected to one side of the direct current circuit 10 through electric valves 15 and 16 and this winding is provided with an electrical midpoint which is connected to the other side of the direct current circuit through a smoothing reactor 17 and a switch device 18. The electric valves 15 and 16 are each provided with an anode, a cathode and a control electrode, or grid, and may be of any of the several types well known in the art, although I prefer to use valves of the gaseous or vapor electric discharge type. A commutating capacitor 19 is connected between corresponding electrodes of the electric valves 15 and 16 in a well known manner.

In order successively to render the electric valves 15 and 16 alternately conductive and nonconductive, their grids are connected to their common cathode circuit through current limiting resistors 20, a negative bias battery 21 and secondary windings 22 and 23, respectively, of a control transformer 24, the primary winding 25 of which is connected to the alternating current circuit 11. Control transformer 24 is of the self-saturating type, that is, those portions of its core section upon which are mounted the secondary coils 22 and 23 are adapted to become saturated by the normal magnetomotive force of the primary winding of the transformer. The saturable core sections of the transformer 24 upon which are mounted the coils 22 and 23, are provided also with the auxiliary saturating windings 26 and 27, respectively, which are arranged to be energized with a unidirectional current proportional to the exciting current drawn by the primary winding 25. For example, these windings may be connected to the secondary winding of a current transformer 28, the primary winding of which is included in series with the primary winding 25, through any suitable rectifying means such as a contact rectifier bridge 29. If desired, a current smoothing reactor 30 and a current limiting resistor 31 may be included in the circuit of the saturating windings 26 and 27. In addition, an adjustable connection 32 to the resistor 31 may be employed to shunt the saturating windings 26 and 27 to obtain various operating characteristics of the control apparatus.

In order to aid in the initiation of the operation of the inverting apparatus, there is provided an auxiliary capacitor 33 adapted to be charged from a battery 34 through a resistor 35 and a switch device 36. When the switch device 36 is operated to its lower position the capacitor 33 is effective momentarily to energize the auxiliary saturating windings 26 and 27 with opposite polarity through the current limiting resistors 37 and 38, respectively, to produce a positive impulse in one of the secondary windings 22 or 23 to excite its associated valve and simultaneously to impress a negative potential upon the grid of the other electric valve. If desired, unilaterally conductive devices, such as contact rectifiers 39 and 40, may be connected across the secondary windings 22 and 23, respectively, to shunt the negative half cycles of the control potential from the grids of the electric valves 15 and 16.

The general principles of operation of the above described converting apparatus will be well understood by those skilled in the art. In brief, if it be assumed that the switch 18 is closed and that electric valve 15 is initially rendered conductive, current will flow from the upper side of the direct current circuit 10 through the left-hand portion of the winding 14 and electric valve 15 to the other side of the direct current circuit, generating a half cycle of alternating current in the transformer 12, which is supplied to the load circuit 11. During this interval the capacitor 19 becomes charged to substantially twice the potential of the direct current circuit and when, substantially 180 electrical degrees later, electric valve 16 is rendered conductive, capacitor 19 is effective to transfer the current from the valve 15 to the valve 16. Current now flows through the right-hand portion of the winding 14 generating a half cycle of alternating current of opposite polarity in the transformer 12. In this manner current is successively commutated between electric valves 15 and 16 by capacitor 19 at the frequency at which the grids of the electric valves are controlled. In the case of the self-excited inverter described above, this frequency is dependent primarily upon the constants of the grid circuit and the phase displacement maintained between the potential of the circuit 11 and that impressed upon the grids of the electric valves 15 and 16, and upon the load conditions on the circuit 11.

In order to initiate operation of the apparatus as described above, the switch device 36 is operated to its lower position. This switch 36 may be operated to its lower position simultaneously with the closing of the switch 18, but is preferably operated subsequent thereto. It will be assumed that the switch 36 has been in its upper position for a sufficient interval of time to allow the capacitor 33 to become completely charged by the battery 34 through the resistor 35. When the switch 36 is operated to its lower position the capacitor 33 discharges through two paths in parallel, one comprising a resistor 37, resistor 31, reactor 30 and winding 26, and the other comprising a resistor 38 and winding 27. The connections are such that a positive impulse is induced in one of the secondary windings, for example, the winding 22, while a negative impulse is induced in the other winding. This positive impulse is effective to overcome the negative bias of the battery 21 and render conductive electric valve 15 to start the apparatus, as described above.

As soon as the operation of the apparatus is initiated, the alternating potential appearing on the circuit 11 is effective to excite the primary winding 25 of the control transformer 24 to supply alternating potentials of peaked wave form to the grids of the electric valves 15 and 16 to render these valves alternately conductive and nonconductive. The contact rectifiers 39 and 40 are effective to shunt the grids of the electric valves 15 and 16, respectively, during the negative half cycles of control potential. The chief advantage of such an arrangement is that the flux supplied by the primary winding 25 of the transformer 24 is concentrated in that particular portion of the core section on which is mounted the active secondary winding; that is, the secondary winding supplying a positive impulse to its associated control grid.

As stated above, the frequency of the alternating current supplied to the load circuit 11 is dependent, among other things, upon the phase displacement between the control potentials impressed upon the grids of the valves 15 and 16 and the potential of the alternating current circuit 11. However, this phase relation has a more important aspect; that is, it determines the periods available for the transfer, or commutation, of the current between electric valves 15 and 16, which is known as the commutating angle. It is well known that it requires a small, but definite, amount of time to transfer the current between the electric valves 15 and 16 and that this time increases with the magnitude of the current that is being commutated. In order to ensure an adequate period for commutation, that is, an adequate commutating angle, under maximum load conditions on the apparatus, it is often desirable to ensure a certain predetermined minimum phase displacement between these two potentials. This predetermined phase relation is maintained in the apparatus described above by means of the auxiliary saturating windings 26 and 27, energized with a unidirectional current proportional to the exciting current of the primary winding 25 by means of a current transformer 28 and the contact rectifier bridge 29. The coils 26 and 27 are connected with opposite polarity so as to have an opposite effect upon the secondary windings 22 and 23 with respect to the alternating potential supplied to the primary winding 25.

It is well known that, in this type of apparatus, the peaked impulses are induced in the secondary windings at the point in the cycle of alternating potential at which the primary magnetomotive force passes through zero. By superimposing a unidirectional magnetomotive force upon the alternating primary magnetomotive force, the point at which the resultant magnetomotive force passes through zero, and thus the phase of the secondary peaked impulses, may be readily controlled. However, if the auxiliary saturating windings 26 and 27 are energized from a source of unidirectional current of constant potential, variations in the voltage, or frequency, of the alternating current circuit 11 occasioned by variations in load conditions on the circuit, will vary the point in the cycle in which the resultant magnetomotive force of the transformer 24 passes through zero, and thus the phase of the secondary peaked potential. However, by deriving the unidirectional current for the auxiliary saturating windings 26 and 27 from the exciting current of the primary winding 25, through the current transformer 28, as described above, the unidirectional magnetomotive force varies in accordance with variations in the exciting current which, in turn, determines the alternating magnetomotive force of the transformer 24; that is, the ratio of the unidirectional magnetomotive force to the alternating magnetomotive is constant irrespective of variations in the potential or the frequency from which the primary winding 25 is excited. In this manner the phase relation between the potential of the circuit 11 and that impressed upon the grids of the valves 15 and 16 is maintained at a predetermined constant value irrespective of variations in the various operating conditions of the circuit. The particular value of this phase angle which the apparatus is effective to maintain may be controlled by varying the adjustable connection 32 to vary the average value of the unidirectional current supplied to the auxiliary saturating windings 26 and 27.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent in the United States is:

1. A self-excited inverting apparatus comprising a source of direct current, an alternating current load circuit, means including a pair of electric valves for transmitting energy therebetween, said valves being provided with control electrodes, means for commutating the current between said valves, a circuit for exciting said control electrodes from the output voltage of the apparatus, and means for maintaining a predetermined commutating angle irrespective of variations in operating conditions of the apparatus.

2. A self-excited inverting apparatus comprising a source of direct current, an alternating current load circuit, means including a pair of discontinuous control electric valves for transmitting energy therebetween, said valves being provided with control electrodes, means for commutating the current between said valves, a circuit for exciting said control electrodes from the output voltage of the apparatus including means for converting the output voltage into one of peaked wave form, and means for maintaining a predetermined phase relation between the output voltage of the apparatus and that impressed upon said control electrodes irrespective of variations in operating conditions of the apparatus.

3. A self-excited inverting apparatus comprising a source of direct current, an alternating current load circuit, means including a pair of discontinuous control electric valves for transmitting energy therebetween, said valves being provided with control electrodes, means for commutating the current between said valves, a circuit for exciting said control electrodes from the output voltage of the apparatus including a self-saturating transformer provided with an auxiliary saturating winding, and a circuit for energizing said saturating winding with a unidirectional current variable in accordance with the exciting current of said transformer.

4. A self-excited inverting apparatus comprising a source of direct current, an alternating current load circuit, means including a pair of discontinuous control electric valves for transmitting energy therebetween, said valves being provided with control electrodes, means for commutating the current between said valves, a circuit for exciting said control electrodes from the output voltage of the apparatus including a self-saturating transformer provided with a primary winding and an auxiliary saturating winding, a current transformer connected in series with said primary winding, and rectifier means connected to energize said saturating winding from the output of said current transformer.

5. In an electric translating circuit, a source of alternating potential, and apparatus for deriving from said source an alternating potential whose phase is fixed with respect to that of said source irrespective of variations in the electrical characteristics of said source comprising a self-saturating transformer energized from said source and provided with an auxiliary saturating winding, and means for energizing said saturating winding with a unidirectional current variable in accordance with the exciting current of said transformer.

6. In an electric translating circuit including a source of alternating potential and an electric valve provided with a control electrode, apparatus for exciting the control electrode from said source comprising apparatus for converting said alternating potential into one of peaked wave form, and means for maintaining a predetermined phase relation between the alternating potential of said source and that impressed upon said electrode irrespective of variations in the operating conditions of said circuit.

7. In an electric translating circuit including a source of alternating potential and an electric valve provided with a control electrode, apparatus for exciting said control electrode from said source comprising a self-saturating transformer energized from said source and provided with an auxiliary saturating winding, and means for energizing said saturating winding with a unidirectional current variable in accordance with the exciting current of said transformer to maintain a predetermined phase relation between the potential of said source and that impressed upon said control electrode.

8. In an electric translating circuit including a source of alternating potential and an electric valve provided with a control electrode, apparatus for exciting said control electrode from said source with a predetermined phase displacement comprising a self-saturating transformer provided with a primary winding connected to said source and with an auxiliary saturating winding, a current transformer connected in series with said primary winding, and rectifier means connected to energize said saturating winding from the output of said current transformer.

BURNICE D. BEDFORD.